United States Patent
Lynn et al.

(10) Patent No.: US 11,613,079 B2
(45) Date of Patent: *Mar. 28, 2023

(54) SYSTEM AND METHOD FOR PRESERVING VALVE MEMBER TRAVEL IN A MULTI-NOZZLE EXTRUDER

(71) Applicant: Xerox Corporation, Norwalk, CT (US)

(72) Inventors: Christopher G. Lynn, Wolcott, NY (US); Peter J. Nystrom, Webster, NY (US); David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 175 days.

This patent is subject to a terminal disclaimer.

(21) Appl. No.: 17/186,225

(22) Filed: Feb. 26, 2021

(65) Prior Publication Data
US 2021/0178679 A1    Jun. 17, 2021

Related U.S. Application Data

(63) Continuation of application No. 16/042,125, filed on Jul. 23, 2018, now Pat. No. 11,000,997.

(51) Int. Cl.
| | |
|---|---|
| *B29C 64/209* | (2017.01) |
| *B33Y 30/00* | (2015.01) |
| *B29C 48/255* | (2019.01) |
| *B29C 48/345* | (2019.01) |
| *B29C 48/21* | (2019.01) |
| *B29C 48/25* | (2019.01) |

(Continued)

(52) U.S. Cl.
CPC ............ *B29C 64/209* (2017.08); *B29C 48/21* (2019.02); *B29C 48/254* (2019.02); *B29C 48/2528* (2019.02); *B29C 48/2556* (2019.02); *B29C 48/2694* (2019.02); *B29C 48/345* (2019.02); *B29C 48/503* (2019.02); *B33Y 30/00* (2014.12); *B29K 2101/12* (2013.01); *B29K 2905/12* (2013.01)

(58) Field of Classification Search
CPC ..... B29C 64/209; B29C 64/321; B29C 48/21; B29C 48/2528; B29C 48/254; B29C 48/2556; B29C 48/2694; B29C 48/345; B29C 48/503; B29C 48/92; B33Y 30/00
See application file for complete search history.

(56) References Cited

U.S. PATENT DOCUMENTS

| | | |
|---|---|---|
| 4,211,494 A | 7/1980 | Fischer et al. |
| 4,922,852 A | 5/1990 | Price |
| 5,214,390 A | 6/1993 | Stempfle |

(Continued)

*Primary Examiner* — Xiao S Zhao
*Assistant Examiner* — Joseph S Leyson
(74) *Attorney, Agent, or Firm* — Maginot Moore & Beck LLP (57) ABSTRACT

An extruder has a valve assembly configured to move pins to open and close the nozzles in a multi-nozzle extruder head independently. The pins of the valve assembly that are driven by actuators into and out of engagement with nozzles in the extruder head are positioned within sleeves that extend between the valve assembly and the extruder head. A gap is provided between the extruder head and the end of the sleeves proximate the extruder head to enable thermoplastic material leaking from the extruder that contacts the pins to remain in a melted or plastic state so the thermoplastic material does not interfere with the movement of the pins.

20 Claims, 4 Drawing Sheets

(51) Int. Cl.
*B29C 48/50* (2019.01)
*B29K 101/12* (2006.01)

(56) References Cited

U.S. PATENT DOCUMENTS

| | | |
|---|---|---|
| 7,246,960 B2 | 7/2007 | Kohyama et al. |
| 7,296,714 B2 | 11/2007 | Byerly |
| 8,894,181 B2 | 11/2014 | Almadhi |
| 11,000,997 B2 * | 5/2021 | Lynn ..................... B29C 48/21 |
| 2016/0325498 A1 | 11/2016 | Gelbart |
| 2016/0339635 A1 | 11/2016 | Nystrom et al. |

\* cited by examiner

SYSTEM AND METHOD FOR PRESERVING VALVE MEMBER TRAVEL IN A MULTI-NOZZLE EXTRUDER

PRIORITY CLAIM

This application is a continuation application that claims priority to U.S. patent application Ser. No. 16/042,125, which is entitled "System And Method For Preserving Valve Member Travel In A Multi-Nozzle Extruder," which was filed on Jul. 23, 2018, and which issued as U.S. Pat. No. 11,000,997 on May 11, 2021.

TECHNICAL FIELD

This disclosure is directed to multi-nozzle extruders used in three-dimensional object printers and, more particularly, to the valves used in such extruders.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many existing three-dimensional printers use a single extruder that extrudes material through a single nozzle. The printhead moves in a predetermined path to emit the build material onto selected locations of a support member or previously deposited layers of the three-dimensional printed object based on model data for the three-dimensional printed object. However, using a printhead with only a single nozzle to emit the build material often requires considerable time to form a three-dimensional printed object. Additionally, a printhead with a larger nozzle diameter can form three-dimensional printed object more quickly but loses the ability to emit build material in finer shapes for higher detailed objects while nozzles with narrower diameters can form finer detailed structures but require more time to build the three-dimensional object.

To address the limitations of single nozzle extruders, multi-nozzle extruders have been developed. In some multi-nozzle extruders, the nozzles are formed in a common faceplate and the materials extruded through the nozzles can come from one or more manifolds. In extruders having a single manifold, all of the nozzles extrude the same material, but the fluid path from the manifold to each nozzle can include a valve that is operated to open and close the nozzles selectively. This ability enables the shape of the swath of thermoplastic material extruder from the nozzles to be varied by changing the number of nozzles extruding material and selectively operating which nozzles extrude material. In extruders having different manifolds, each nozzle can extrude a different material with the fluid path from one of the manifolds to its corresponding nozzle including a valve that can be operated to open and close the nozzle selectively. This ability enables the composition of the material in a swath to vary as well as the shape of the swath of thermoplastic material extruder from the nozzles to be varied. Again, these variations are achieved by changing the number of nozzles extruding material and the nozzles operated to extrude material. These multi-nozzle extruders enable different materials to be extruded from different nozzles to form an object without having to coordinate the movement of different extruder bodies. These different materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to quickly form areas of an object, such as its interior regions.

The valves in some multi-nozzle extruders include pins that are selectively moved to open and close the nozzles in the extruder. The pins can have a rounded metal tip at one end that is pushed into engagement with a nozzle with many pounds of force to seal the nozzle. Retracting the rounded end of the pin from the nozzle enables thermoplastic material to flow through the nozzle and be extruded from the nozzle. The extruder head is heated to keep the material in the pressure chambers within the extruder head in a thermoplastic state. To avoid adverse consequences at the actuators that move the pins, the actuators are located at a distance from the extruder heads that is sufficient to thermally insulate the actuators from the heat produced at the extruder head. To prevent thermoplastic material from escaping the extruder head at the position where each pin enters the head, a seal is positioned around the shaft of the pin. This seal must both minimize the escape of thermoplastic material from the extruder head as well as allow the pin to slide within the opening in the seal to open and close the associated nozzle. The thermoplastic material kept within the pressure chamber or chambers of the extruder head are maintained at a relatively high pressure to enable extrusion from the nozzle. This pressure also enables some of the thermoplastic material to leak slowly through the seal and the movement of the pin within the seal may drag some thermoplastic material outside of the seal. A material having a low coefficient of friction, such as PFTE, is useful for reducing the friction between the pins and the seals. When only a small amount of thermoplastic material leaks through the seals it does not present a problem because the heat near the seal helps keep the material plastic so it does not interfere with pin motion. With time, however, the leakage can accumulate and push some of the material far enough from the heat at the seal so that the material freezes. The hardened material can interfere with the movement of the valve pins. One solution is to mechanically remove the leaked material from around the pins with tweezers, but that effort is tedious and time-consuming. Preserving each pin's freedom of reciprocating motion would be beneficial.

SUMMARY

A new multi-nozzle extruder insulates the valve pins from movement interference caused by leaking thermoplastic material at the seals. The multi-nozzle extruder includes an extruder head having a chamber for holding a volume of thermoplastic material and a plurality of nozzles fluidically connected to the chamber, a plurality of actuators, a plurality of elongated solid members that are operatively connected to the actuators in a one-to-one correspondence, each elongated solid member extending from the actuator associated with the elongated solid member into the extruder head and through the chamber in the extruder head to enable the actuator to push and pull a distal end of the elongated solid member into and out of engagement, respectively, with one of the nozzles in the extruder head in a one-to-one correspondence between the elongated solid members and the nozzles to enable and disable flow of thermoplastic material from the chamber through the nozzles independently, and a plurality of hollow members, each hollow member being positioned about one of the solid elongated members in a one-to-one correspondence and each hollow member extending from the actuator to a position short of the extruder head to form a gap between a distal end of the hollow member to the extruder head.

BRIEF DESCRIPTION OF THE DRAWINGS

The foregoing aspects and other features of multi-nozzle extruders that insulate valve pin movement from interference caused by leaking thermoplastic material are explained in the following description, taken in connection with the accompanying drawings.

DETAILED DESCRIPTION

For a general understanding of the environment for the device disclosed herein as well as the details for the device, reference is made to the drawings. In the drawings, like reference numerals designate like elements.

As used herein, the term "extrusion material" refers to a material that is emitted by an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Build materials also include other materials that do not require heating but are later hardened by exposure to air or energy, such as UV light or heat. These types of materials include food materials. For example, chocolate and cheese can be extruded to form objects in various shapes, such as bunnies, eggs, or the like. Examples of support materials include, but are not limited to, high-impact polystyrene (HIPS), polyvinyl alcohol (PVA), and other materials capable of extrusion after being thermally treated. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the illustrated examples use extrusion material that is supplied as filament to the heaters, other extrusion material supplies can be used, such as particulate or spherical ball extrusion materials. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in an extruder during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the terms "extruder" refers to a component of a printer that pressurizes extrusion material in a manifold and then opens a passageway to the manifold to emit extrusion material from a nozzle. The extrusion material can be at room temperature for some materials, such as epoxies and glues. Other extrusion materials are heated to a temperature that melts or softens the extrusion material so it flows to the manifold connected by passageways to one or more nozzles. The extruders described in this document include a valve assembly that can be electronically operated to move pins into and out of engagement with nozzles to enable the extrusion material to flow through nozzles selectively. A controller operates the valve assembly to independently connect the nozzles in a plurality of nozzles to the manifold to extrude the thermoplastic material. As used herein, the term "nozzle" refers to an orifice in an extruder that is fluidly connected to the manifold in an extruder and through which thermoplastic material is emitted towards a material receiving surface. During operation, the nozzle can extrude a substantially continuous linear swath of the thermoplastic material along the process path of the extruder. The diameter of the nozzle affects the width of the line of extruded thermoplastic material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of thermoplastic material for delivery to one or more nozzles in the extruder during a three-dimensional object printing operation. As used herein, the term "swath" refers to any pattern of the extrusion material that the extruder forms on a material receiving surface during a three-dimensional object printing operation. Common swaths include straight-line linear arrangements of extrusion material and curved swaths. In some configurations, the extruder extrudes the thermoplastic material in a continuous manner to form the swath with a contiguous mass of the extrusion material in both process and cross-process directions, while in other configurations the extruder operates in an intermittent manner to form smaller groups of thermoplastic material that are arranged along a linear or curved path. The three-dimensional object printer forms various structures using combinations of different swaths of the extrusion material. Additionally, a controller in the three-dimensional object printer uses object image data and extruder path data that correspond to different swaths of extrusion material prior to operating the extruder to form each swath of extrusion material.

As used herein, the term "process direction" refers to a direction of relative movement between an extruder and a material receiving surface that receives thermoplastic material extruded from one or more nozzles in the extruder. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion.

As used herein, the term "cross process direction" refers to an axis that is perpendicular to the process direction and parallel to the extruder faceplate and the material receiving surface. The process direction and cross-process direction refer to the relative path of movement of the extruder and the surface that receives the thermoplastic material. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the cross-process direction distance that separates different nozzles in the extruder to adjust the corresponding cross-process direction distance that separates the lines of thermoplastic material that are extruded from the nozzles in the extruder as the lines form a swath.

During operation of the additive manufacturing system, an extruder moves in the process direction along both straight and curved paths relative to a surface that receives thermoplastic material during the three-dimensional object printing process. Additionally, an actuator in the system optionally rotates the extruder about the Z axis to adjust the effective cross-process distance that separates nozzles in the extruder to enable the extruder to form two or more lines of thermoplastic material with predetermined distances between each line of the thermoplastic material. The extruder moves both along the outer perimeter to form outer walls of a two-dimensional region in a layer of the printed object and within the perimeter to fill all or a portion of the two-dimensional region with the thermoplastic material.

Figure 1:
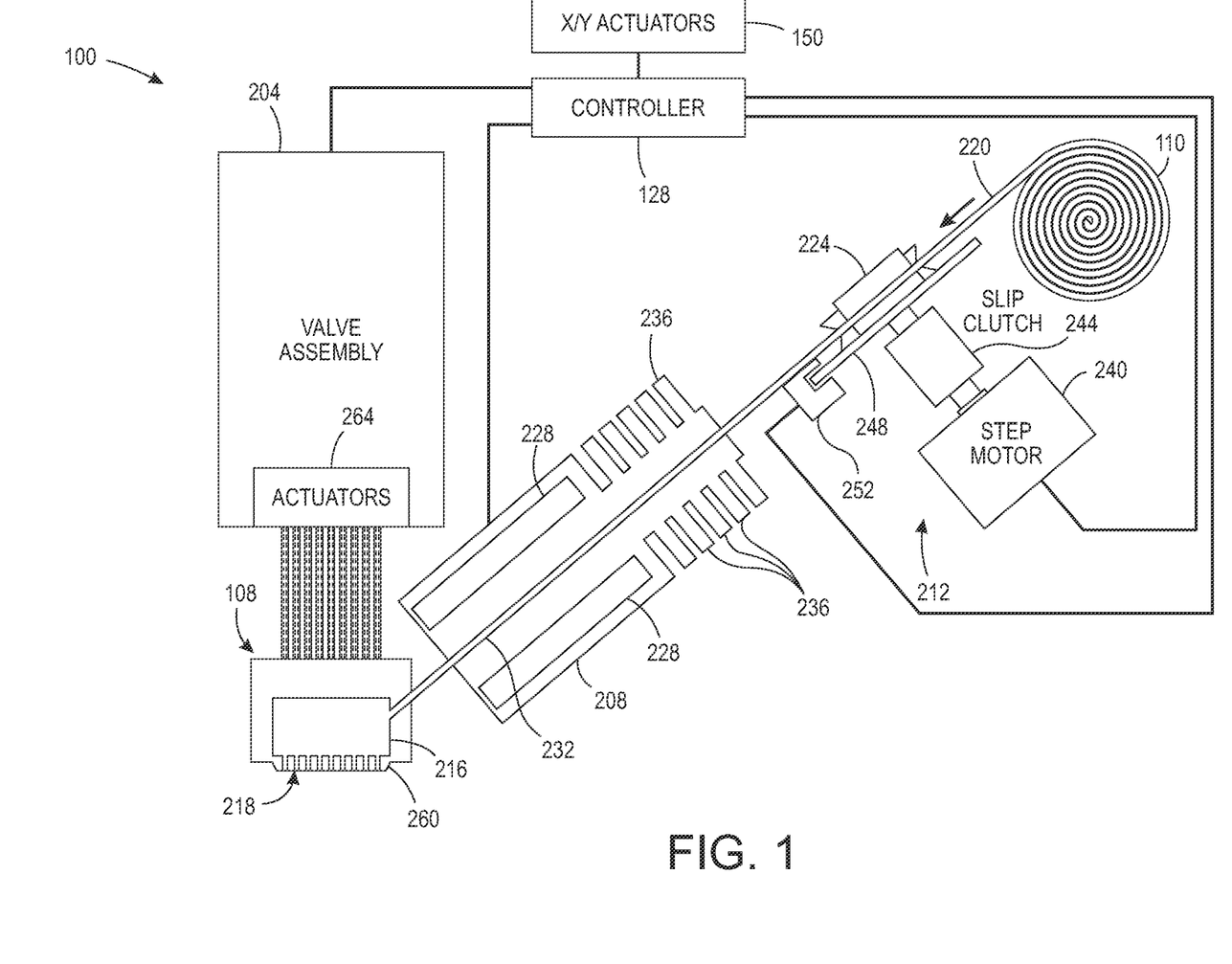
FIG. 1 depicts an additive manufacturing system that places sleeves about the valve pins to protect pin movement from interference caused by hardened thermoplastic material.

FIG. 1 depicts an additive manufacturing system 100 having an extruder head 108 that extrudes a plurality of thermoplastic materials through nozzles 218 in a planar member, sometimes called a faceplate, 260. Although the printer 100 is depicted as a printer that uses planar motion to form an object, other printer architectures can be used with the extruder and the controller configured to regulate speed of the extruder with reference to the angular orientation of the extruder. These architectures include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Only one manifold 216 is shown in FIG. 1 to simplify the figure, but the extruder head 108 can have a plurality of manifolds 216. In one embodiment, each manifold 216 in the extruder head 108 is operatively connected to a different heater 208 that is fed by a different extrusion material supply 110 in a one-to-one-to-one correspondence. In the extruder head 108, each nozzle 218 is fluidly connected to only one of the manifolds within the extruder head 108 so each nozzle can extrude a thermoplastic material that is different than the materials extruded from nozzles connected to other manifolds. Extrusion from each nozzle is selectively and independently activated and deactivated by controller 128 operating the actuators 264 that are operatively connected to the pins 272 to reciprocate the pins 272 within the sleeves 268, which are hollow members. The actuators, pins, and sleeves are arranged in a one-to-one-to-one correspondence with each other. A distal end of each nozzle 218 is flush with the faceplate 260 to enable the faceplate 260 to be used to shape swaths of the materials in an object. The pins 272 are elongated solid members that extend from the actuator to the nozzle openings and are moved to allow material to flow selectively from the nozzles. The flow of material is terminated when an actuator is operated by the controller to move the pins into engagement with the nozzles and the material flows when the actuator is operated to retract the pins from the nozzles.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators 150 that control the movement of a support member that supports an object being formed with material extruded from the extruder head 108. The controller 128 is also operatively connected to a memory that includes volatile data storage devices, such as random access memory (RAM) devices, and non-volatile data storage devices such as solid-state data storage devices, magnetic disks, optical disks, or any other suitable data storage devices. The memory stores programmed instruction data and three-dimensional (3D) object image data. The controller 128 executes the stored program instructions to operate the components in the printer 100 to form the three-dimensional printed object on the support member and to print two-dimensional images on one or more surfaces of the object. The 3D object image data includes, for example, a plurality of two-dimensional image data patterns that correspond to each layer of thermoplastic material that the printer 100 forms during the three-dimensional object printing process. The extruder path control data include a set of geometric data or actuator control commands that the controller 128 processes to control the path of movement of the extruder head 108 using the actuators 150 and to control the orientation of the extruder head 108 and the valve assembly 204 using a ZO actuator in the actuators 150. The ZO actuator is configured to rotate the extruder head 108 and valve assembly 204 about a Z-axis that is perpendicular to the faceplate 260 and extends between the faceplate 260 and the support member. The extruder head 108 and the valve assembly 204 are collectively called an extruder in this document. The controller 128 operates the actuators to move the extruder head 108 above the support member as noted above while the extruder extrudes thermoplastic material to form an object.

The system 100 of FIG. 1 also includes an extrusion material dispensing system 212 for each heater 208 that is connected to a manifold 216 in the extruder head 108. The extrusion material from each separate supply 110 is fed to the corresponding heater 208 at a rate that maintains the pressure of the thermoplastic material in the manifold 216 connected to the heater 208 within a predetermined range during operation of the system 100. The dispensing system 212 is one embodiment that is suitable for regulating pressure of the thermoplastic material in each manifold of the extruder head 108. Additionally, the controller 128 is operatively connected to an actuator in each dispensing system 212 to control the rate at which the dispensing system 212 delivers extrusion material from a supply 110 to the heater 208 fed by the supply. The heater 208 softens or melts the extrusion material 220 fed to the heater by the drive roller 224. Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208, alternative embodiments of the dispensing system 212 use one or more actuators to operate a mechanical mover in the form of a rotating auger or screw. The auger or screw moves solid phase extrusion material from a supply 110 in the form of extrusion material powder or pellets into the heater 208.

In the embodiment of FIG. 1, each heater 208 has a body formed from stainless steel that includes one or more heating elements 228, such as electrically resistive heating elements, which are operatively connected to the controller 128. Controller 128 is configured to connect the heating elements 228 to electrical current selectively to soften or melt the filament of extrusion material 220 in the channel or channels within the heater 208. While FIG. 1 shows heater 208 receiving extrusion material in a solid phase as solid filament 220, in alternative embodiments, the heaters receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any opening other than the connection to the manifold 216, which maintains a temperature that keeps the extrusion material in a thermoplastic state as it enters the manifold. The extruder head 108 can also include additional heating elements to maintain an elevated temperature for the thermoplastic material within each manifold within the extruder head. In some embodiments, a thermal insulator covers portions of the exterior of the extruder head 108 to maintain a temperature within the manifolds within the extruder head. Again, the regions around the nozzles are maintained at a temperature that keeps the material in a thermoplastic state so it does not begin solidifying as it travels to the distal ends of the nozzles 218 in the faceplate 260.

To maintain a fluid pressure of the thermoplastic material within the manifolds 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device that applies frictional force to an object to move the object up to a predetermined set point. When the range about the predetermined set point for the frictional force is exceeded, the device slips so it no longer applies the frictional force to the object. The slip clutch enables the force exerted on the filament 220 by the roller 224 to remain within the constraints of the strength of the filament no matter how frequently, how fast, or how long the actuator 240 is driven. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its average speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required in the manifold for adequate formation of the object. These print conditions include the type of extrusion material being fed to the extruder, the temperature of the thermoplastic material being emitted from the extruder, the speed at which the extruder is being moved in the X-Y plane, the position of the feature being formed on the object, the angle at which the extruder is being moved relative to the platform, and the like.

Figure 2:
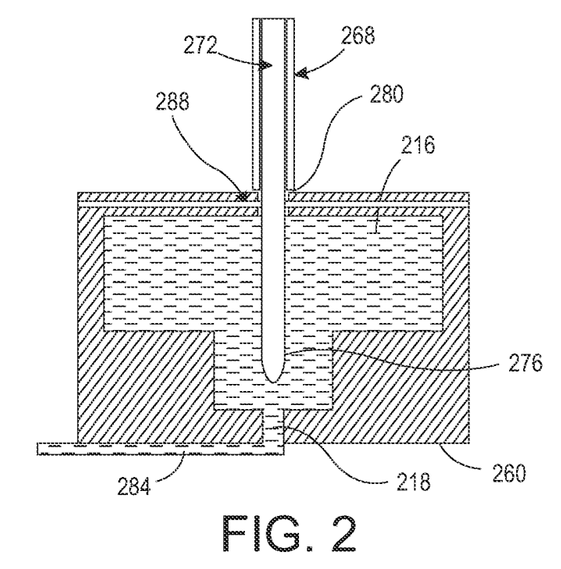
FIG. 2 is a block diagram of a single sleeve and pin combination of the valve assembly in FIG. 1.
Figure 3:
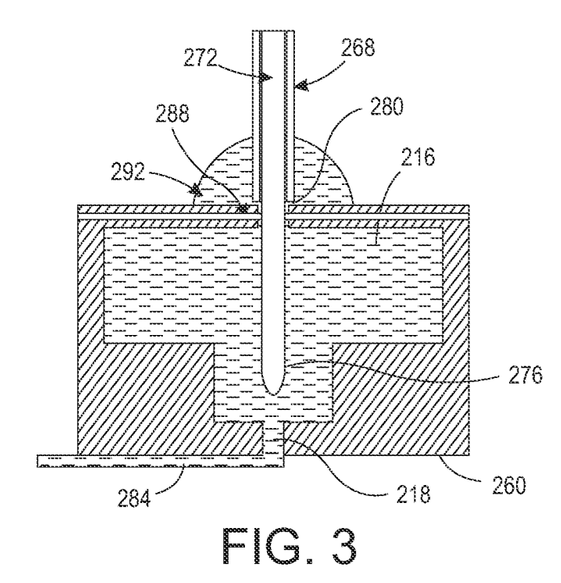
FIG. 3 is a block diagram of a single sleeve and pin combination of the valve assembly in FIG. 1 illustrating the protection of the pin movement from hardened thermoplastic material.

To simplify the explanation of the pin protection for the pins 272 of valve assembly 204, FIG. 2 depicts a single pin 272. The structure discussed with reference to this figure and to FIG. 3 is applicable to each pin of each valve assembly of a system similar to the one shown in FIG. 1. As noted previously, one end of the pin 272 is operatively connected to an actuator in the plurality of actuators 264 in the valve assembly 204. The other distal end 276 of the pin 272 is rounded to facilitate the engagement of this end of the pin 272 with the nozzle 218. When the actuator connected to the pin 272 is operated to push the rounded end 276 into engagement with the nozzle 218, the flow of thermoplastic material from the manifold 216 into the nozzle 218 is blocked. When the actuator connected to the pin 272 is operated to pull the rounded end 276 away from the nozzle 218, the pressure within the manifold 216 pushes thermoplastic material through the nozzle 218 to extrude a ribbon of thermoplastic material 284 from the extruder head 108.

With continued reference to FIG. 2, a seal 288 is positioned within extruder head 108 and pin 272 extends through an opening in the seal 288. The seal 288 can be a flexible planar member having a plurality of openings positioned within the extruder head 108 above the manifold 216. Each opening in the seal receives one of the pins 272. Alternatively, each opening in the upper surface of the extruder head 108 can be configured with an O-ring seal having a diameter that accommodates a pin 272. The seal 288 helps contain the thermoplastic material in the manifold 216 but movement of the pin 272 within the opening in the seal 288 can pull thermoplastic material from the manifold 216 onto the upper surface of the extruder head 108. Although pin 272 is positioned within a sleeve 268 that extends from the valve assembly 204 to a position immediately short of the upper surface of the extruder head 108, the gap 280 positioned at the end of the sleeve 268 proximate the upper surface of the extruder head 108 enables thermoplastic material pulled through the seal 288 to squeeze through the gap 280 onto the upper surface of the extruder head 108. The thermoplastic material that remains in the gap 280 or immediately adjacent to the gap 280 is sufficiently heated by the heat exuded by the extruder head 108 that it remains in a melted or plastic state. The melted material within the manifold 216 is at a higher pressure than the melted material that escapes the manifold at the gap. This lower pressure outside the manifold urges the melted material away from the gap rather than pushing the material up into the sleeve. Consequently, the pin 272 is able to reciprocate in this area of the gap 280 without interference that would otherwise impede the movement of the pin. While some of the thermoplastic material can be pushed out a distance from the gap 280 that enables the thermoplastic material to harden into accumulation 292 as shown in FIG. 3, the sleeve 268 and the gap 280 are configured to keep the thermoplastic material that contacts pin 272 in a temperature range that maintains the material in the melted or plastic phase so it does not interfere with the movement of the pin 272.

Figure 4:
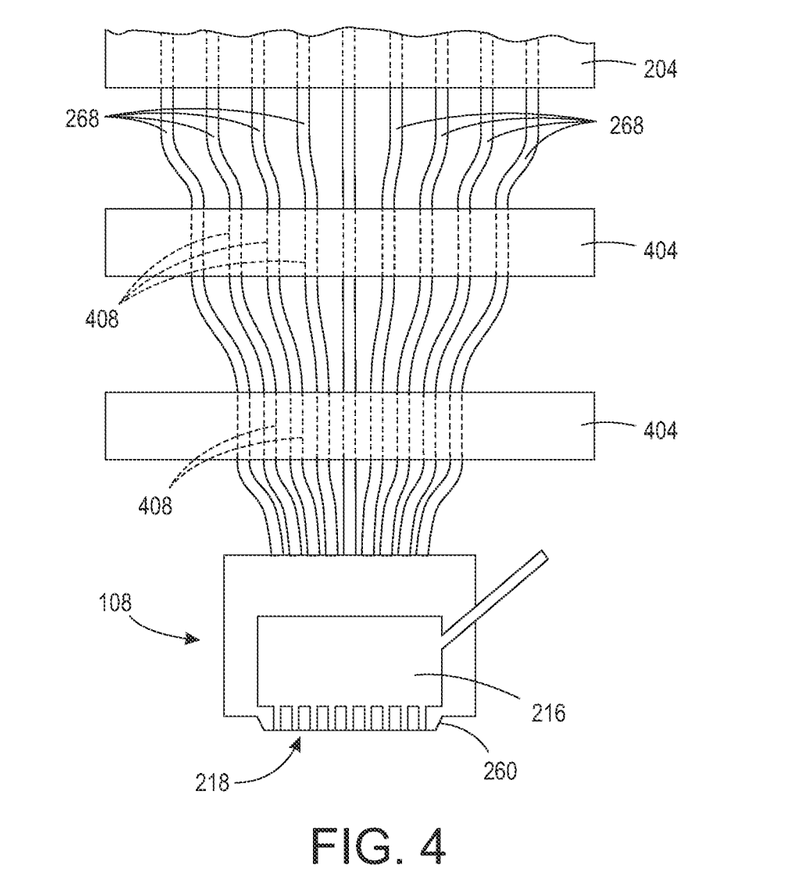
FIG. 4 depicts the sleeves surrounding the valve pins being bent slightly along a path to the extruder head of the system in FIG. 1.

FIG. 4 depicts an advantage that arises from the use of sleeves 268 with the pins 272. In FIG. 4, the sleeves 268 for six pins exit the valve assembly 204. These sleeves 268 then bend toward one another and the center of sleeve supports 404 as they pass through sleeve supports 404. Sleeve supports 404 have channels 408 cut through them to receive the sleeves 268. These channels are arranged in smaller areas in the two different sleeve supports to help constrain the sleeves 268 so they fit well within a 2×3 array configuration at the upper surface of the extruder head 108. Thus, the pins 272 within the sleeves 268 enter the extruder head 108 at a 90° angle, which facilitates the reciprocating movement of the pins within the manifold 216 and so they align well with the nozzles 218 in the faceplate 260 that are arranged in the same 2×3 array. This 90° angle for the entrance of the pin into the extruder head 108 reduces drag on the pin, reduces wear on the seal, and enables a greater number of pins to be used within a given nozzle region. Thus, a larger pneumatic valve assembly, which is required to house the greater number of actuators needed for more nozzles and pins, can be accommodated because the space necessary for separation of the pins at the valve assembly can be more tightly constrained at the extruder head 108. Another advantage of the flexible sleeves is the ability of the sleeves to absorb force from the actuators 264 above that needed to seat the distal ends of the pins 272 in the nozzles 218.

Figure 5A:
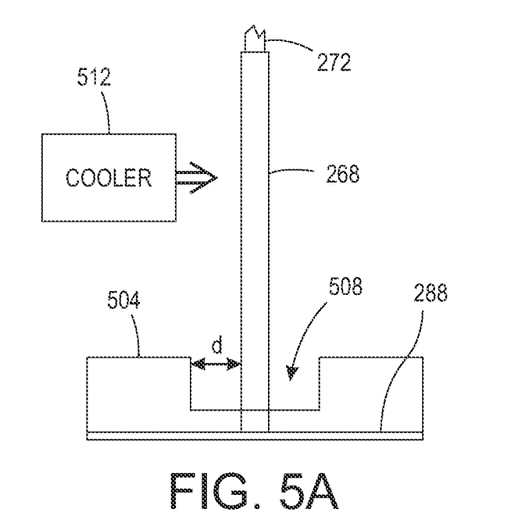
FIG. 5A depicts an alternative embodiment of the sleeves about the pins that moves as material escapes the extruder head and FIG. 5B illustrates the sleeve movement.
Figure 5B:
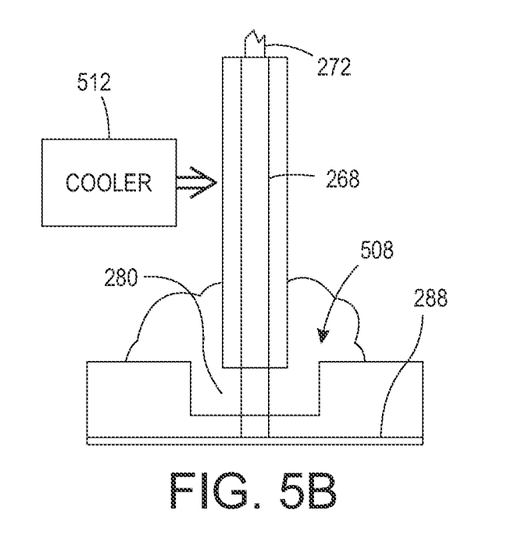

An alternative embodiment is shown in FIG. 5A and FIG. 5B. In this embodiment, the upper member 504 of the extruder head 108 has a recessed opening 508 for each sleeve 268 and pin 272 combination in a one-to-one correspondence. The clearance between the outer circumference of the sleeve 268 and the wall of the upper member 504 within the recessed opening 508 is no greater than 1 mm. The pin 272 is truncated at the seal 288 to simplify the figure. The sleeve 268 is shorter than pin 272, as in the embodiment of FIG. 3, but it is configured to slide longitudinally about the pin 272. In manufacture of the extruder, the sleeve 268 is secured at the end distal from the upper member 504 or in the middle of the sleeve so the end of the sleeve closest to the upper member 504 is nearby or against the upper member 504 within the recessed opening 508 as shown in FIG. 5A. The distance d between a sleeve and the sides of the recessed opening is small, typically less than 0.5 mm to ensure that material that flows past the seal 288 and into this region is kept in a thermoplastic state. During operation of the extruder head, material may leak through the seal 288 or the pin 272 can pull material from the manifold through the seal 288 due to flexing of the sleeve or by the material pushing the sleeve 268 away from the upper member 504 as shown in FIG. 5B. The recessed opening 508 helps keep the material within the recessed opening at the temperature of the upper member 504, which is sufficient to keep the material within the recessed opening from hardening as long as the extruder head 108 is heated. The amount of melted material about the sleeve 268 is a function of the thermal conductivity of the material. For materials having a higher degree of thermal conductivity, the melted material hardens at a greater distance from the recessed opening 508 than material having a lesser degree of thermal conductivity. Thus, the gap 280 needs to be maintained to the thermal conditions of the material near or within the recessed opening 508. A cooler 512, such as a blower or fan, can be positioned to direct air flow, which can be conditioned air, toward the sleeves 268 to remove thermal energy from the sleeves. This air flow or other cooling fluid helps keep the sleeves 268 at a temperature that prevents melted material from entering the sleeves.

The sleeves 268 can be made from metal, such as stainless steel, that has a low thermal conductivity. Metals such as stainless steel, titanium, carbon steel, and tantalum have thermal conductivities below 60 W/m K, which is a low thermal conductivity within this document. The sleeves can be made or lined with materials having a low coefficient of friction, such as polytetrafluoroethylene (PTFE) to reduce friction between the sleeve 268 and the pin 272 and facilitate the reciprocating motion of the pins 272 within the sleeves. Alternatively, the sleeve can contain a low friction lubricant to both facilitate the motion of the pins as well as to prevent thermoplastic material from entering the sleeve. In another embodiment, a low friction coating, such as diamond-like carbon, fluorinated diamond-like carbon, or titanium nitride, is applied to the pin to facilitate motion of the pin within the sleeve and inside the head. The gap 280 between the end of the sleeve 268 that is proximate the upper surface of the extruder head 108 is approximately 1 mm or less for the types of build and support materials identified above, although other gaps can be used. The gap 280 can differ from the disclosed range if the extruder head is heated to a higher temperature or if the thermal conductivity of the melted material carries the heat from the extruder head to a greater distance from the extruder head as noted above. If sleeves 268 are made from a rigid material, such as stainless steel, pin flexing can be substantially reduced. Consequently, the length of the pin between the pneumatic actuator and the nozzle can be more precisely controlled so actuator travel can be reduced and the speed of opening and closing the nozzles can be increased. Additionally, the precision in travel made possible by rigid sleeves enables all of the valves to close consistently so lower force can be used on the pins to close the nozzles. This lower force reduces wear on the pins and extends the operational life of the extruder.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An extruder comprising:
   an extruder head having a chamber for holding a volume of thermoplastic material and a plurality of nozzles fluidically connected to the chamber;
   a plurality of elongated solid members, each elongated solid member having a distal end that is proximate one of the nozzles in the plurality of nozzles in a one-to-one correspondence;
   a plurality of actuators that are operatively connected to the plurality of elongated solid members in a one-to-one correspondence, each elongated solid member extending from the respective actuator associated with the respective elongated solid member into the extruder head and through the chamber in the extruder head, each actuator being configured to push and pull the distal end of the respective elongated solid member into and out of engagement with the respective nozzle; and
   a plurality of hollow members, each elongated solid member being configured to slide within one of the hollow members in a one-to-one correspondence and each hollow member extending from the respective actuator for the respective elongated solid member to a position short of the extruder head to form a gap between a distal end of the respective hollow member and the extruder head.

2. The extruder of claim 1, the extruder head further comprising:
   a seal; and
   each elongated solid member passes through the seal into the chamber in the extruder head.

3. The extruder of claim 2 wherein the seal is a planar member having a plurality of openings, each opening in the seal receiving one of the elongated solid members in a one-to-one correspondence.

4. The extruder of claim 2, the extruder head further comprising:
   a plurality of O-rings, each O-ring being positioned within a surface of the extruder head and each O-ring being configured to receive one of the elongated solid members in a one-to-one correspondence.

5. The extruder of claim 2 further comprising:
   at least one hollow member support platform having a plurality of openings, each opening being configured to receive one of the hollow members in a one-to-one correspondence, the at least one hollow member support platform being positioned between the plurality of actuators and the extruder head.

6. The extruder of claim 5 wherein the hollow members bend from the plurality of actuators toward a center of the at least one hollow member support platform and the hollow members bend from the at least one hollow member support platform toward a center of the extruder head.

7. The extruder of claim 6, the extruder head further comprising:
   a planar member, each nozzle in the plurality of nozzles being positioned within the planar member and a distal end of each nozzle is flush with an external surface of the planar member.

8. The extruder of claim 7 wherein the gap between the distal end of each hollow member and the extruder head is approximately 1 mm or less.

9. The extruder of claim 8 wherein the distal end of each elongated solid member is rounded.

10. The extruder of claim 9 wherein each hollow member consists essentially of metal.

11. The extruder of claim 10 wherein the metal consists essentially of a low thermally conductive metal.

12. The extruder of claim 11 wherein the metal consists essentially of stainless steel.

13. The extruder of claim 11, each elongated member further comprising:
    a coating having a low coefficient of friction to facilitate movement of the respective elongated member within the respective hollow member.

14. The extruder of claim 9 wherein each hollow member is configured to reduce friction between an interior surface of each hollow member and the respective elongated solid member moving within the respective hollow member.

15. The extruder of claim 14 further comprising:
    a lubricant within each hollow member to facilitate movement of the respective elongated member within the respective hollow member.

16. The extruder of claim 10 further comprising:
    a controller operatively connected to the plurality of actuators, the controller being configured to operate the plurality of actuators independently to control flow of thermoplastic material from the nozzles of the extruder head independently.

17. The extruder of claim 16, the extruder head further comprising:
    an upper member having a plurality of recessed openings, a portion of each hollow member and a portion of each elongated solid member being positioned within one of the recessed openings in a one-to-one correspondence between the recessed openings in the upper member of the extruder head and the plurality of hollow members and the plurality of elongated solid members.

18. The extruder of claim 17 wherein each hollow member includes a sleeve and each sleeve is shorter than a length of each elongated solid member extending from the respective actuator configured to move the respective elongated solid member to a surface of the upper member within the respective recessed opening.

19. The extruder of claim 18 wherein each hollow member is configured to slide longitudinally along the respective elongated solid member within the respective hollow member.

20. The extruder of claim 19 further comprising:
a cooler configured to direct air flow toward the plurality of hollow members.

\* \* \* \* \*